US012785915B2

United States Patent
(12) United States Patent
Ibrahim et al.

(10) Patent No.: US 12,785,915 B2
(45) Date of Patent: Nov. 3, 2026

(54) DUPLEX MODE INDICATION, SWITCHING, AND COORDINATION FOR SIDELINK COMMUNICATION

(71) Applicant: QUALCOMM Incorporated, San Diego, CA (US)

(72) Inventors: Abdelrahman Mohamed Ahmed Mohamed Ibrahim, San Diego, CA (US); Muhammad Sayed Khairy Abdelghaffar, San Jose, CA (US); Seyedkianoush Hosseini, San Diego, CA (US); Ahmed Attia Abotabl, San Diego, CA (US); Wei Yang, San Diego, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 441 days.

(21) Appl. No.: 17/712,061

(22) Filed: Apr. 1, 2022

(65) Prior Publication Data

US 2023/0318797 A1 Oct. 5, 2023

(51) Int. Cl.

| | |
|---|---|
| ***H04B 7/00*** | (2006.01) |
| ***H04L 5/14*** | (2006.01) |
| ***H04W 72/1263*** | (2023.01) |
| *H04W 92/18* | (2009.01) |

(52) U.S. Cl.

CPC ........... *H04L 5/14* (2013.01); *H04W 72/1263* (2013.01); *H04W 92/18* (2013.01)

(58) Field of Classification Search

CPC ......... H04L 5/14; H04L 5/006; H04L 5/0064; H04L 5/0091; H04W 72/1263; H04W 92/18

See application file for complete search history.

(56) References Cited

U.S. PATENT DOCUMENTS

| | | | | |
|---|---|---|---|---|
| 2011/0222445 | A1* | 9/2011 | Alanara | H04L 1/0026 370/281 |
| 2017/0064721 | A1* | 3/2017 | Noh | H04L 5/0091 |
| 2018/0110057 | A1 | 4/2018 | Park et al. | |
| 2018/0212746 | A1* | 7/2018 | Kazmi | H04L 5/14 |
| 2020/0068595 | A1* | 2/2020 | Dinan | H04W 4/46 |

(Continued)

FOREIGN PATENT DOCUMENTS

| | | | |
|---|---|---|---|
| WO | WO-2012105057 A1 * | 8/2012 | H04B 7/15564 |
| WO | WO-2021237385 A1 * | 12/2021 | H04B 7/336 |

OTHER PUBLICATIONS

Partial International Search Report—PCT/US2023/012595—ISA/EPO—Jun. 1, 2023.

(Continued)

*Primary Examiner* — Edan Orgad
*Assistant Examiner* — Hidayat Dabiri
(74) *Attorney, Agent, or Firm* — Harrity & Harrity LLP/QUALCOMM Incorporated

(57) ABSTRACT

A sidelink network is disclosed that provides a duplex mode indication as well as a duplex mode switching and coordination for a sidelink network device. The duplex mode indication controls the duplex mode switching by the sidelink network device between a half-duplex mode and a full-duplex mode of communication. The resulting control of the duplex mode switching reduces blocking and reduces power consumption.

29 Claims, 8 Drawing Sheets

(56) References Cited

U.S. PATENT DOCUMENTS

| | | | | |
|---|---|---|---|---|
| 2020/0084727 | A1* | 3/2020 | Yerramalli | H04W 72/0473 |
| 2020/0163103 | A1* | 5/2020 | Kuang | H04W 72/23 |
| 2020/0351057 | A1* | 11/2020 | Yeo | H04L 1/1854 |
| 2021/0028891 | A1 | 1/2021 | Zhou et al. | |
| 2021/0028916 | A1* | 1/2021 | Huang | H04L 5/14 |
| 2021/0037549 | A1 | 2/2021 | Akkarakaran et al. | |
| 2021/0051600 | A1* | 2/2021 | Fakoorian | H04W 52/242 |
| 2021/0135770 | A1* | 5/2021 | Schober | H04L 5/14 |
| 2021/0176033 | A1* | 6/2021 | Oteri | H04L 5/14 |
| 2021/0203469 | A1 | 7/2021 | Abedini | |
| 2022/0030612 | A1* | 1/2022 | Balasubramanian | H04L 43/16 |
| 2022/0104198 | A1 | 3/2022 | Balasubramanian et al. | |
| 2022/0182160 | A1* | 6/2022 | Su | H04B 17/309 |
| 2022/0248342 | A1* | 8/2022 | Zhao | H04W 52/383 |
| 2022/0286871 | A1* | 9/2022 | Zhang | H04W 72/046 |
| 2022/0338213 | A1* | 10/2022 | Elshafie | H04L 5/0044 |
| 2022/0353815 | A1* | 11/2022 | Lin | H04W 52/0232 |
| 2023/0217290 | A1* | 7/2023 | Guo | H04L 5/0073 370/329 |
| 2023/0224969 | A1* | 7/2023 | Zhou | H04W 74/0833 370/278 |
| 2024/0236714 | A1* | 7/2024 | Thangarasa | H04W 24/10 |
| 2025/0185026 | A1* | 6/2025 | Yao | H04W 72/02 |

OTHER PUBLICATIONS

International Search Report and Written Opinion—PCT/US2023/012595—ISA/EPO—Jul. 24, 2023.

* cited by examiner

DUPLEX MODE INDICATION, SWITCHING, AND COORDINATION FOR SIDELINK COMMUNICATION

TECHNICAL FIELD

This application relates to wireless communication systems, and more particularly to a duplex mode indication, duplex mode switching, and duplex mode coordination for sidelink wireless communication.

INTRODUCTION

Cellular wireless networks are typically hierarchical in that a base station controls the signaling by the various mobile devices. A message from one cellular device to another must then be routed through the corresponding base station(s). To enhance performance, New Radio (NR) 5G has expanded to provide a novel paradigm of wireless networks designated as sidelink (SL) communications. In SL, a user equipment (UE) may communicate directly with another UE without having to relay messages through a base station.

In SL, a transmitting (TX) UE transmits directly to a receiving (RX) UE. SL must coexist with the 5G air interface (Uu) so the SL transmissions use the 5G time domain and frequency domain framework. Within this 5G framework, certain time slots and subcarriers are organized into a resource pool for SL. With the resources allocated, a TX UE may proceed to transmit in a slot. This transmission may be half-duplex such that a slot is dedicated to a single TX UE. Alternatively, the transmission may be full-duplex such that a UE functions as both a TX UE and an RX UE simultaneously. Full-duplex mode enhances SL performance in certain scenarios whereas half-duplex mode is more energy efficient. But conventional SL has no way of intelligently selecting between half-duplex (HD) and full-duplex (FD) modes.

SUMMARY

The following summarizes some aspects of the present disclosure to provide a basic understanding of the discussed technology. Its sole purpose is to present some concepts of one or more aspects of the disclosure in summary form as a prelude to the more detailed description that is presented later.

In one aspect of the disclosure, a user equipment is provided that includes: a transceiver configured to measure a received signal strength; a processor configured to determine a channel busy ratio from the received signal strength, the processor being further configured to: select between a full-duplex mode and a half-duplex mode to provide a selected duplex mode based upon at least one of the channel busy ratio and a traffic type for a sidelink, and use the transceiver to communicate over the sidelink according to the selected duplex mode In another aspect of the disclosure, a network device is provided that includes: a transceiver; and a processor configured to control the transceiver to transmit a duplex mode command to a first user equipment to switch from a half-duplex mode to a full-duplex mode responsive to a determination that the first user equipment is scheduled to simultaneously transmit and receive over a sidelink.

In yet another aspect of the disclosure, a first user equipment is provided that includes: a transceiver; and a processor configured to control the transceiver to transmit a message to a second user equipment on a sidelink between the first user equipment and the second user equipment, the message being a request to the second user equipment to select between a half-duplex mode and a full-duplex mode for communication on the sidelink.

In another aspect of the disclosure, a method of duplex mode switching by a first user equipment is provided that includes: selecting a rate matching pattern for a physical sidelink shared channel message responsive to a duplex mode switching delay for the first user equipment; transmitting the rate matching pattern to a second user equipment; transmitting the physical sidelink shared channel message to the second user equipment according to the rate matching pattern in a first portion of a slot while the first user equipment is in a first duplexing mode selected from a half-duplex mode and a full-duplex mode; at the first user equipment, switching from the first duplexing mode to a second duplexing mode selected from the half-duplex mode and the full-duplex mode during the duplex mode switching delay, and receiving a physical sidelink feedback channel message from the second user equipment in a second portion of the slot while the first user equipment is in the second duplexing mode.

Other aspects, features, and embodiments of the disclosure will become apparent to those of ordinary skill in the art upon reviewing the following description.

BRIEF DESCRIPTION OF THE DRAWINGS

Implementations of the present disclosure and their advantages are best understood by referring to the detailed description that follows. It should be appreciated that like reference numerals are used to identify like elements illustrated in one or more of the figures.

DETAILED DESCRIPTION

An advantageous NR sidelink network is disclosed that coordinates a duplex mode switching between a half-duplex (HD) and a full-duplex mode of communication between user equipments (UEs). To provide a better appreciation of the advantageous duplex mode coordination disclosed herein, some background concepts for NR sidelink will first be discussed. During a sidelink (SL) communication, a transmitting (TX) UE transmits directly to a receiving RX UE such as through the use of a PC5 interface. SL coexists with the 5G air interface (Uu) between a UE and a gNodeB (gNB). SL transmissions may thus use the 5G time and frequency resources as provided by the 5G orthogonal frequency-division multiplexing (OFDM) waveform.

Figure 1:
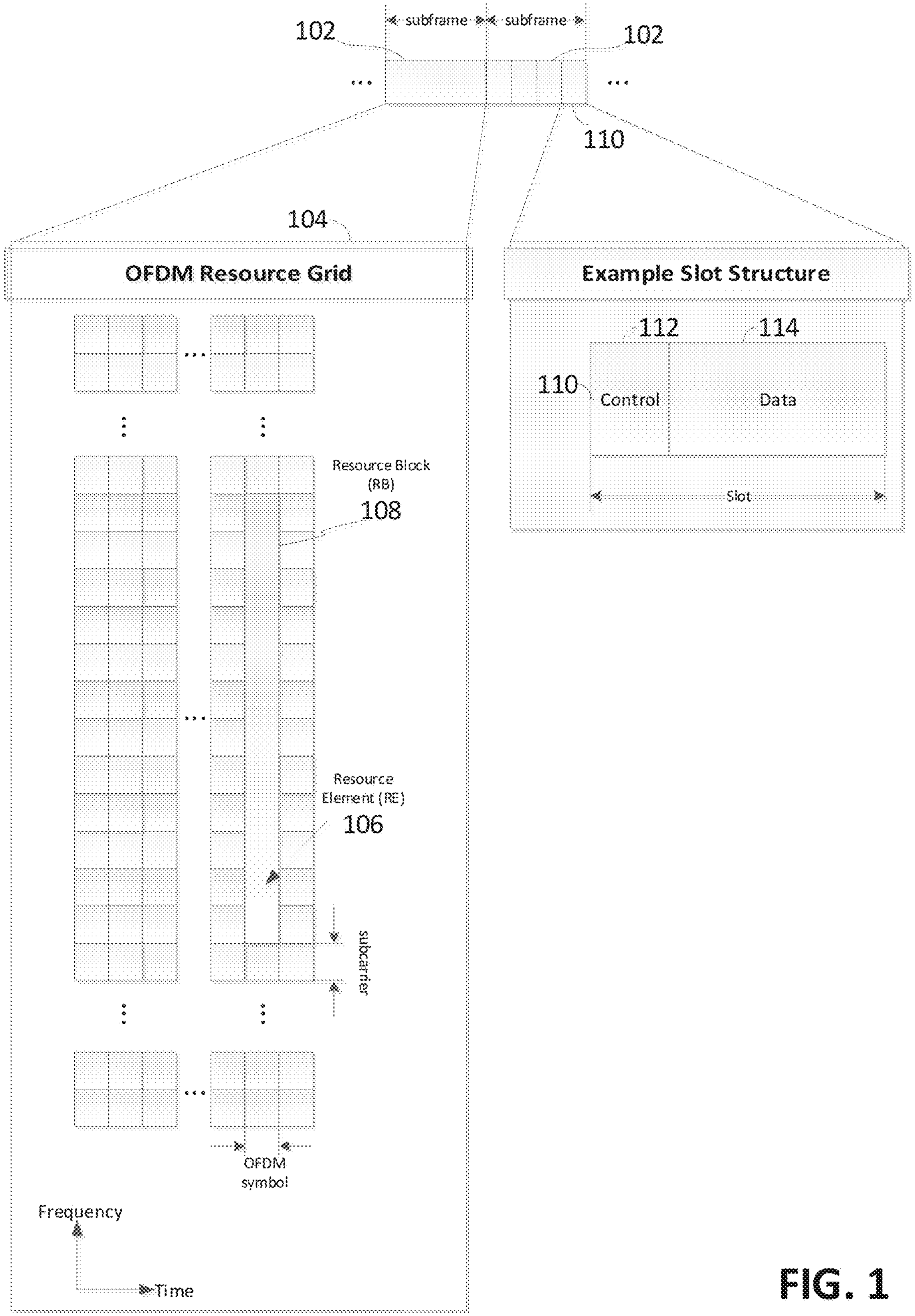
FIG. 1 illustrates some example time and frequency resources for the sidelink communication disclosed herein.

The time and frequency resources in a 5G OFDM waveform are organized into a resource grid. An example resource grid 104 is illustrated in FIG. 1. In resource grid 104, time is in the horizontal direction with units of OFDM symbols and frequency is in the vertical direction with units of subcarriers or tones. In the time domain, a frame refers to a duration of 10 ms for wireless transmissions, with each frame consisting of 10 subframes of 1 ms each. An expanded view of an exemplary subframe 102 is also shown in FIG. 1. However, as those skilled in the art will readily appreciate, the physical layer (PHY) transmission structure for any particular application may vary from the example described here, depending on any number of factors.

The resource grid 104 may be used to schematically represent time-frequency resources for a given antenna port. For example, in a MIMO implementation with multiple antenna ports, a corresponding multiple number of resource grids 104 may be available for communication on the various antenna ports. The resource grid 104 is divided into multiple resource elements (REs) 106. An RE 106, which is 1 subcarrier×1 symbol, is the smallest discrete part of the time-frequency resource grid, and contains a single complex value representing data from a physical channel or signal. A block of twelve consecutive subcarriers defined a resource block (RB) 108, which has an undefined time duration in the NR standard. In FIG. 1, resource block 108 extends over a symbol duration. A set of contiguous RBs 108 form a bandwidth part (BWP).

Each 1 ms subframe 102 may consist of one or multiple adjacent slots. In the example shown in FIG. 1, one subframe 102 includes four slots 110, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (e.g., one or two OFDM symbols). These mini-slots may in some cases be transmitted occupying resources scheduled for ongoing slot transmissions for the same or for different UEs.

An expanded view of a slot 110 illustrates a control region 112 and a data region 114. In general, the control region 112 may carry control channels (e.g., the physical sidelink control channel (PSCCH)), and the data region 114 may carry data channels (e.g., the physical sidelink shared channel (PSSCH)). The structure illustrated in FIG. 1 is merely exemplary in nature, and different slot structures may be utilized, and may include one or more of each of the control region(s) and data region(s).

The various REs 106 within an RB 108 may be scheduled to carry one or more physical channels, including control channels, shared channels, data channels, etc. Other REs 106 within the RB 108 may also carry pilots or reference signals, including but not limited to a demodulation reference signal (DMRS) or a channel-state information reference signal (CSI-RS). These pilots or reference signals may be used by a receiving device to perform channel estimation of the corresponding channel, which may enable coherent demodulation/detection of the control and/or data channels within the RB 108.

Figure 2:
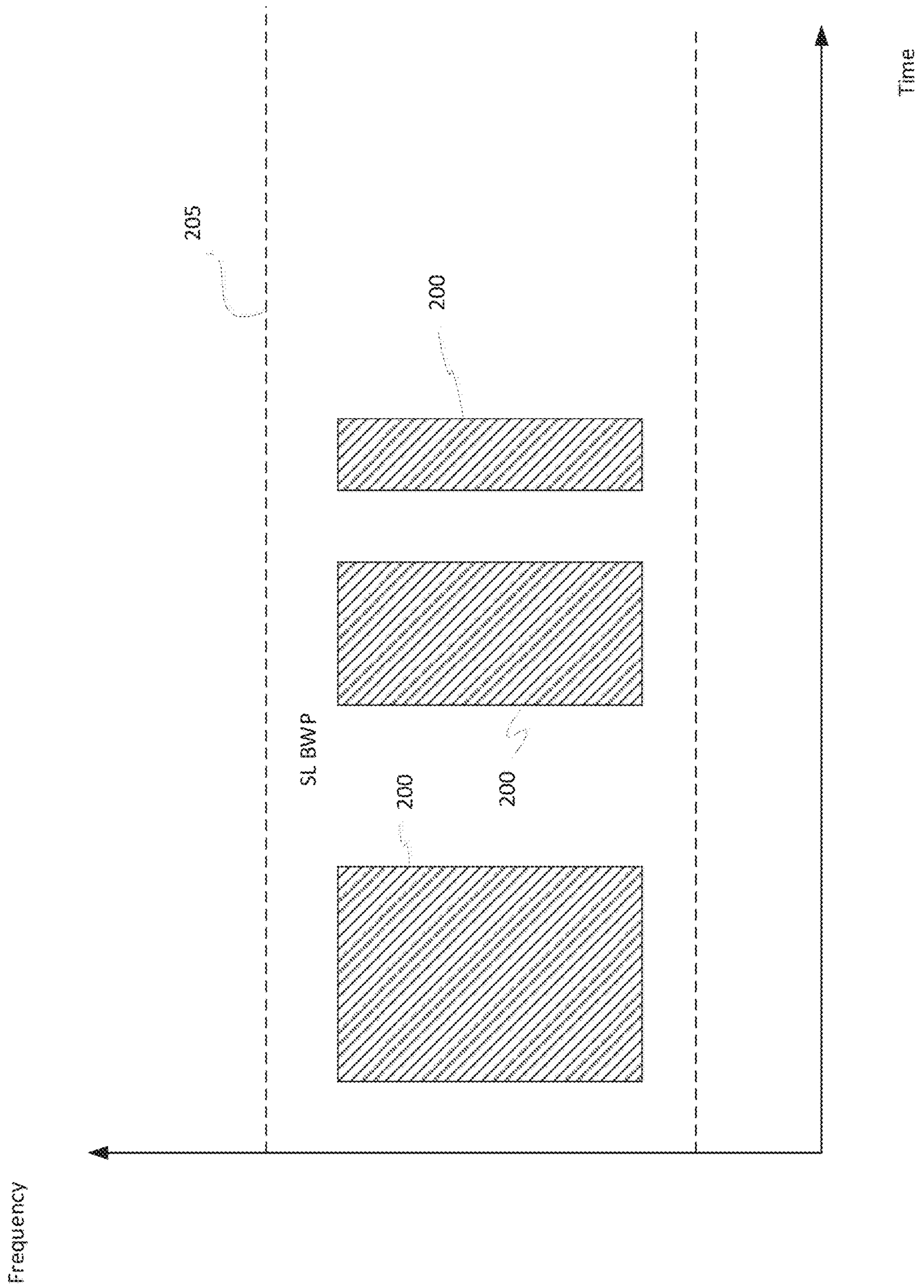
FIG. 2 illustrates an example sidelink resource pool for the sidelink communication disclosed herein.
Figure 3:
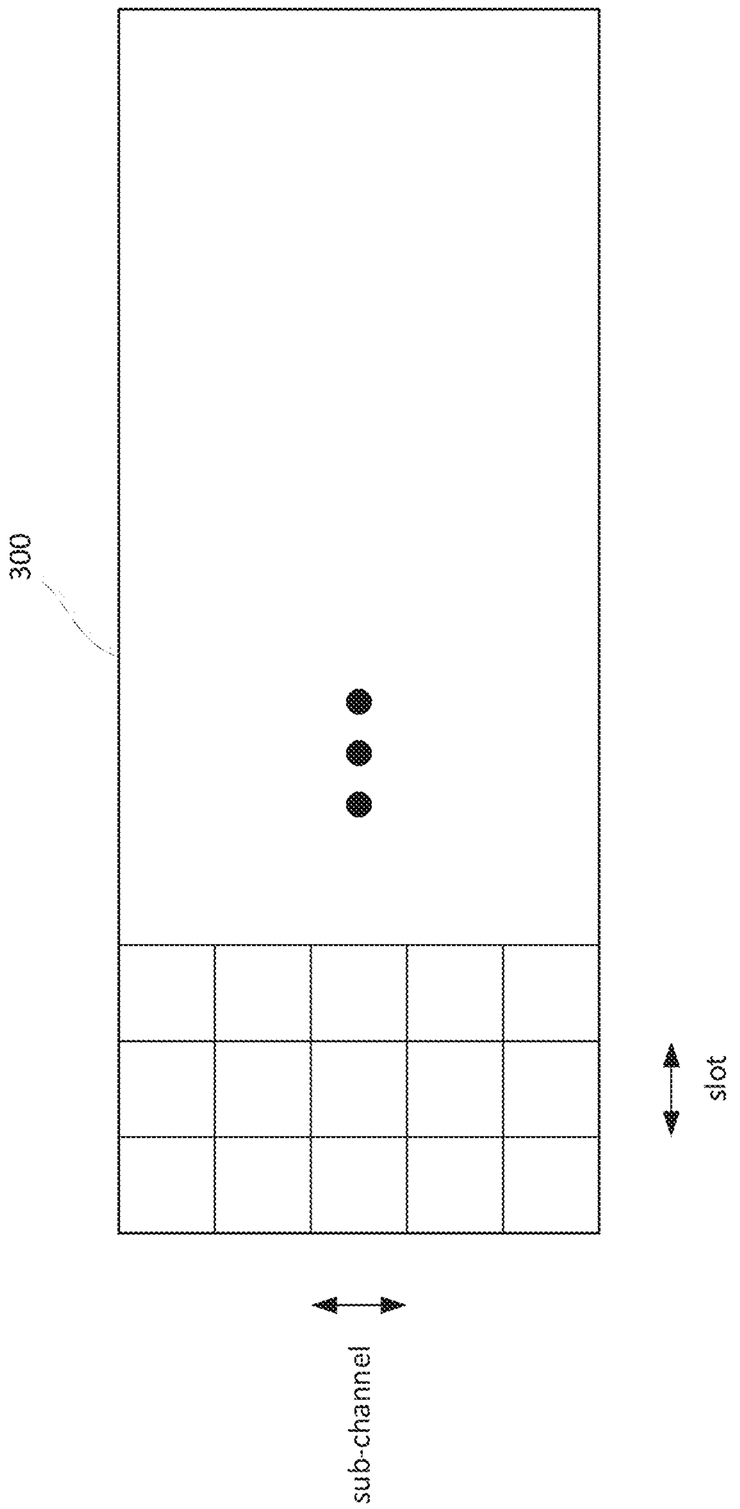
FIG. 3 illustrates a portion of the sidelink resource pool of FIG. 2.

Within this 5G framework, certain slots and subcarriers are organized into a resource pool for SL. An example resource pool 200 is shown in FIG. 2 within an SL BWP 205. Within SL BWP 205, only certain time slots are configured to be within resource pool 200. Similarly, only certain RBs within SL BWP 205 are configured to be within resource pool 200. The RBs for resource pool 200 are contiguous whereas the time slots may be contiguous or non-contiguous. A contiguous time slot portion 300 of an example resource pool is shown in FIG. 3. The resource blocks in the resource pool are divided into sub-channels, where each sub-channel includes a configurable sub-carrier number (nub) of contiguous resource blocks. The number of sub-channels is also configurable.

Figure 4:
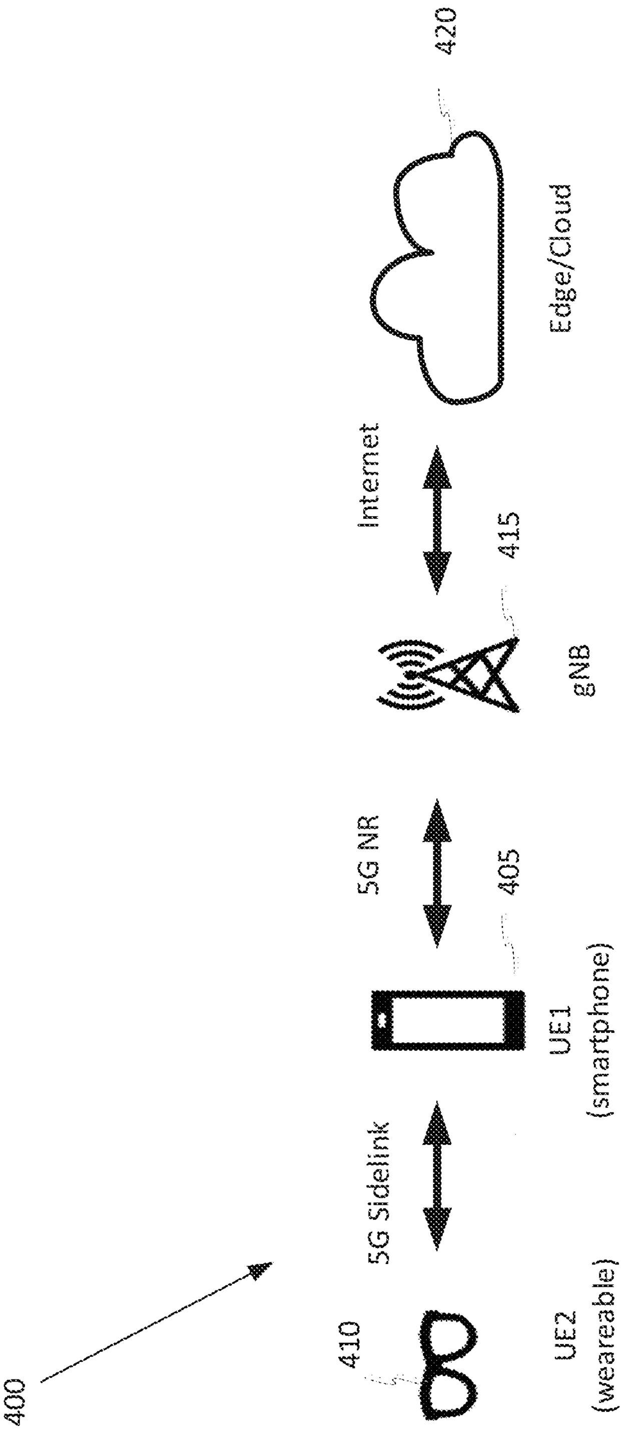
FIG. 4 illustrates an example sidelink network configured to practice a duplex mode indication, switching, and coordination in accordance with an aspect of the disclosure.

An example sidelink network 400 is shown in FIG. 4 between a first UE 405 (e.g., a smartphone) and a second UE 410 (e.g., a wearable). First UE 405 and second UE 410 may communicate with each other directly through a sidelink. First UE 405 may also communicate through a Uu interface with a gNB 415 that in turn networks with a node in the cloud 420 through the internet. The selection of time and frequency resources in the resource pool used by the sidelink may be controlled by gNB 415, which is known as a mode 1 resource allocation. Alternatively, UEs 405 and 410 may autonomously select their time and frequency resources from the resource pool, which is known as a mode 2 resource allocation. In a mode 2 resource allocation, each UE 405 and 410 senses whether potential resources are available before a sidelink communication may be performed. In contrast, there is no need for either UE to sense in a mode 1 resource allocation because the resource allocation is controlled by gNB 415.

Regardless of whether the resource allocation occurs under mode 1 or mode 2, the resource allocation may be either a half-duplex or a full-duplex allocation. In a half-duplex allocation, a given time resource and the associated sub-channel(s) are assigned exclusively to a one of UEs 405 and 410. Since this allocation is half-duplex, each allocated UE then functions as only one of an RX UE or a TX UE. Given this half-duplex allocation, UEs 405 and 410 may proceed to communicate over a sidelink using a half-duplex mode of communication. But in a full-duplex resource allocation, both UEs 405 and 410 are assigned frequency resources that are used simultaneously. Since the allocation is full duplex, each allocated UE may then function simultaneously as both a TX UE and an RX UE. In an in-band full-duplex resource allocation, resource elements are shared by UEs 405 and 410. Each UE may then transmit and receive over the same resource element. In a sub-band full-duplex resource allocation, resource elements are not shared by UEs 405 and 410. For example, the frequency resources assigned to one UE may be separated by a guard band from the frequency resources assigned to another UE. Regardless of whether the full-duplex resource allocation is in-band or sub-band, the UEs may then proceed to communicate over a sidelink using a full-duplex mode of communication. Full-duplex mode enhances SL performance in certain scenarios whereas half-duplex mode is more energy efficient. In general, there has been no development of a framework to intelligently select between HD and FD modes. A technique for controlling the switching between half-duplex and full-duplex sidelink communication will now be discussed in more detail.

Duplexing Mode Switching

An intelligent duplex mode switching control technique is provided to select between HD and FD modes. For example, network congestion as well as traffic type and a packet delay budget may be used to control the duplex mode switching. Within NR SL, a channel busy ratio (CBR) is used as a metric for network congestion. CBR may be defined as the fraction of subframes for which the received signal strength indicator (RSSI) exceeds a predetermined threshold. The fraction may be further defined with respect to a sliding window of 100 subframes.

Intelligent duplex mode switching may use the CBR as an example metric of network congestion to control when to switch the duplex mode from HD to FD. Should the network be congested as indicated by a relatively high CBR (CBR greater than a threshold CBR), then switching to an FD mode reduces blocking as compared to operating in an HD mode. If the CBR is less than the threshold CBR, then switching to the HD mode saves power. In addition, should there be strong interference from clutter (e.g., environmental features such as buildings, other structures, and vegetation that cause signal loss due to scattering and absorption), then a fallback to the HD mode is indicated. As noted earlier, intelligent duplex mode switching may also depend upon the traffic type and the packet delay budget. For example, a UE may be switched to an FD mode for ultra reliable low latency communication (URLLC) transmissions. Some benefits of the intelligent duplex mode switching for SL will now be discussed.

Benefits of Intelligent Duplex Mode Switching for SL

The intelligent duplex mode switching disclosed herein has a number of benefits as compared to functioning only in the HD mode. For example, suppose a transmit (TX) UE has a single unicast or groupcast SL session established under a mode 2 resource allocation. Switching from HD to FD mode would then allow the TX UE to perform sensing for the mode 2 resource allocation while transmitting in the SL session, which improves future resource allocation. If instead the TX UE remains in an HD mode, the TX UE cannot simultaneously sense and transmit. Similarly, a TX UE may have multiple unicast or groupcast SL sessions established under a mode 2 resource allocation. Switching from HD to FD then allows the TX UE to not only sense while transmitting but also receive, which improves the ensuring resource reservation and resource utilization.

A receive (RX) UE also benefits with the intelligent mode switching from HD to FD modes. For example, suppose a UE has one or more bidirectional unicast/groupcast HD sessions with other FD UEs. The UE is thus both an RX UE and also a TX UE that could simultaneously transmit in one direction to one FD UE and receive in another direction from another FD UE. For example, by switching to the FD mode, a UE could simultaneously transmit in a first unicast session to a first FD UE and receive in a second unicast session with a second FD UE. In such an FD mode, the UE may then transmit an acknowledgement (ACK) to the second FD UE in the same Physical Sidelink Feedback Channel (PSFCH) occasion that the UE uses to monitor for an ACK/NACK from the first FD UE. FD enables a UE to simultaneously transmit and receive on different sessions in the physical sidelink shared channel (PSSCH) and to simultaneously transmit and receive PSFCH transmissions for different sessions. Some mode-dependent SL configurations will now be discussed.

Mode-Dependent SL Configurations

In addition to switching between FD and HD modes, intelligent duplex mode switching may also change the SL Radio Resource Control (RRC) configuration parameters depending upon whether an FD or HD mode is selected. There would thus be a relationship between the RRC channel configuration and the FD or HD duplex mode. In a first option for this link between the duplex mode selection and the RRC channel configuration, the selection of the duplex mode implicitly implies switching the RRC sidelink channel configurations. For example, different semi-persistent scheduling (SPS) configurations may have different periodicities depending upon whether an HD or FD mode is active. Similarly, resource pool configurations may depend on the HD/FD mode selection such as the SL-PowerControl information element, which controls the power of various SL transmissions. Another example resource pool configuration that may depend on the HD/FD mode selection is the SL-MinMaxMCS-config information element, which controls the SL modulation and coding scheme (MCS). Beam-based operation may be implicitly enabled in a transition from HD mode to the FD mode as well. In a second option, the same SL channel configuration may be used for FD/HD modes, but the relevant parameters are dynamically adapted. For example, transmit parameters may be indicated in a SL Control Information (SCI) message.

As discussed earlier, the gNB controls the sidelink resource allocation in a mode 1 resource allocation whereas the UE autonomously senses and controls the sidelink resource allocation in a mode 2 resource allocation. A duplex mode indication will now be discussed in more detail for a mode 1 resource allocation.

Duplex Mode Indication in Mode 1

To improve resource utilization in a mode 1 resource allocation for full-duplex-capable UEs, the gNB may schedule transmissions from a first UE (a UE-A) to a second UE (a UE-B) on the same time resources as used for transmissions from UE-B to UE-A. Since the gNB is scheduling simultaneous transmissions by both UEs, the gNB will also command the UEs to switch from the HD mode to the FD mode. The gNB may uses a suitable downlink control information (DCI) format to both schedule transmissions and to control the selection of either the HD mode or the FD mode. For example, the gNB may transmit the DCI using DCI format 3_0 to schedule transmissions from an SL TX UE. Should the gNB be scheduling a UE to both transmit and receive in the same time slot using DCI, the gNB may also configure the DCI with a duplex mode indication to inform the UE to switch from HD mode to FD mode. For example, the scheduling DCI may inform a UE to switch from HD mode to FD mode if the same resources that the UE is scheduled to transmit over are also used to receive by the UE in another unicast or groupcast session. The gNB accounts for the latency or switching delay needed by each UE to switch from HD mode to FD mode in the DCI scheduling. To indicate whether SL is allowed on a given time slot, the gNB may use RRC signaling to provide a slot format indicator (SFI) for the slot format (i.e., to identify whether SL is permissible on the time slot). The scheduling by the gNB of the UEs in a mode 1 resource allocation may be dynamic or semi-static. Each UE may signal to the gNB the gap delay (number of symbols) that the UE needs to switch the duplexing mode. For example, a UE may need to tune its RF frontend (RFFE) based upon the duplex mode such that there is a duplex mode switching gap (which may also be denoted as a duplex mode switching delay) from one duplexing mode (HD or FD) to the other during which the RFFE is tuned accordingly. Similarly, the automatic gain control (AGC) in the RX UE may differ depending upon the duplexing mode. Regardless of whether the scheduling is dynamic or semi-static, the gNB accounts for the switching delays for the UEs in the resulting resource allocation. A duplex mode coordination for Mode 2 resource allocation will now be discussed.

Duplex Mode Coordination in Mode 2

Figure 5:
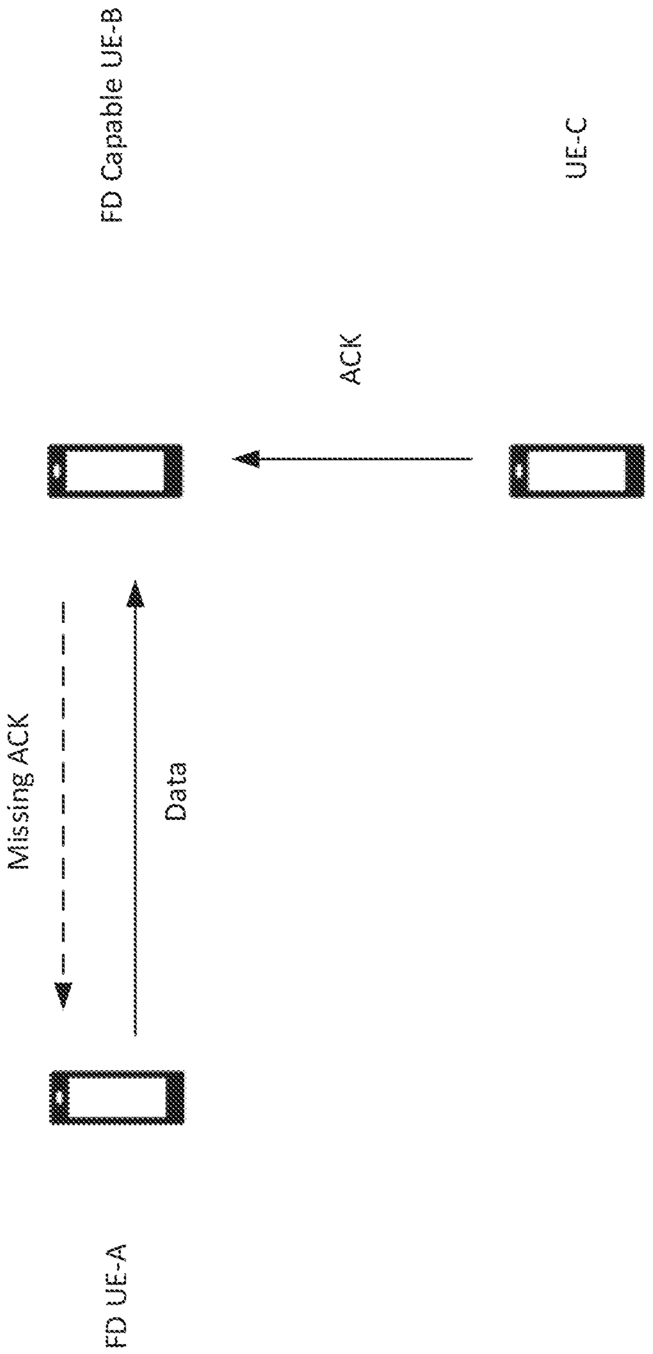
FIG. 5 illustrates an example blocking scenario addressed by a sidelink duplex mode indication, switching, and coordination in accordance with an aspect of the disclosure.

In Mode 2, the duplex mode may be coordinated between UEs. For example, the duplexing mode may be coordinated between two FD-capable UEs in a SL unicast session. One of the UEs in the session may request the other UE to switch its duplexing mode. For example, a UE operating in HD mode is more congested in a unicast session. Due to the congestion, various blocking scenarios may arise. An example blocking scenario is shown in FIG. 5. A UE-A operates in the FD duplex mode while sending data to an FD-capable UE-B that is currently operating in the half-duplex mode. UE-B is also in another session with a UE-C that is currently sending an acknowledgment (ACK) to UE-B. Because UE-B is operating in a half-duplex mode, UE-B cannot simultaneously transmit an ACK to UE-A acknowledging a successful receiving of data from UE-A while receiving the ACK from UE-C. Should UE-B give priority to receiving the ACK from UE-C, UE-B is thus blocked from sending an ACK to UE-A.

To prevent this blocking, UE-A may request UE-B switch to the FD mode or signal to UE-B the identity of its duplexing mode (in this example, FD). This duplex mode coordination signaling may occur using inter-UE coordination signaling that is also used to indicate the Mode 2 resource allocation. Alternatively, UE-B may determine its duplexing mode based on the scheduled TX and RX transmissions. Should UE-B operate in the FD mode, UE-B can use the same resources used by UE-A for a data transmission (e.g., a PSSCH transmission) for a data transmission to UE-A. A given UE may also fallback from FD mode to HD mode to save power if there is no congestion. For example, UE-A may switch to the HD mode after indicating to UE-B that UE-A is going to do so. UE-B may then save power by remaining in the HD mode and avoid scheduling transmissions to UE-A on the same resources as used by UE-A for transmissions to UE-B.

As in a mode 1 resource allocation, the duplex mode switching in a mode 2 resource allocation may be dynamic or semi-static. In a dynamic mode switching, the mode switching may be dependent on the channel type (e.g., PSSCH vs PSFCH) or the symbol format (e.g., UL or sub-band full-duplex (SBFD)). As discussed previously, each UE has a corresponding switching gap that is defined by the number of OFDM symbols over which the UE is switching from one duplex mode to the other. This duplex mode switching delay or gap may be as little as one symbol or may extend over multiple symbols. In a unicast session, a UE that is planning a duplex mode switch may not be able to receive or transmit during the switching gap. A UE in a unicast session with another UE may signal its non-preferred resources (which may also be denoted as non-reserved) to the other UE such as through a sidelink control information (SCI) message. This signaling of non-preferred resources is used in the duplex mode coordination disclosed herein by including within the non-preferred resources the symbols needed to perform the duplex mode switch. The duplex mode switching delay is thus identified by being included in the non-preferred resources. Similarly, a UE in a groupcast session may exclude the symbols needed to perform the duplex mode switching from its preferred resources. The UE in the groupcast session may then transmit to other UEs such as through an SCI message the identity of its preferred resources, which will exclude the switching gap symbols.

Figure 6:
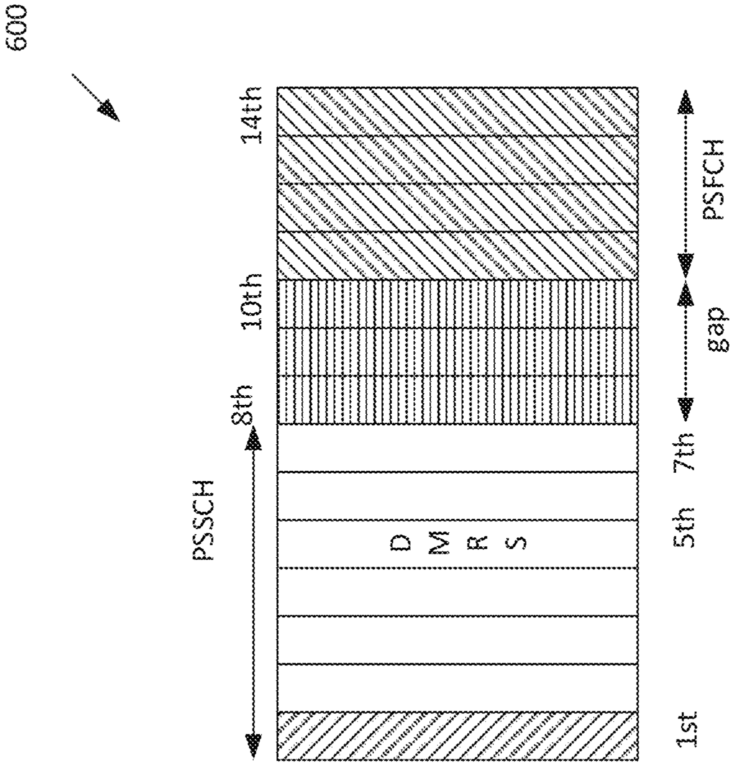
FIG. 6 illustrates an example sidelink time slot with a dynamic duplex mode switching in accordance with an aspect of the disclosure.

As noted earlier, the duplex mode coordination may also account for the SL channel type. For example, a slot with both the PSSCH and the PSFCH may have a first duplexing mode for the PSSCH and a second duplexing mode for the PSFCH. An example slot 600 with both a PSSCH and a PSFCH is shown in FIG. 6. The PSSCH extends from a $1^{st}$ symbol to a $7^{th}$ symbol although the first symbol is a repeat from a previous slot for AGC settling. During the PSSCH, the UE is in a first duplexing mode but begins a mode switch starting at the 8th symbol. The switching gap is 3 symbols long and thus extends from the $8^{th}$ symbol to a $10^{th}$ symbol. Slot 600 ends with the PSFCH, which extends from an $11^{th}$ symbol to a $14^{th}$ symbol. The UE may operate in the HD duplex mode during the PSSCH and in the FD duplex mode during the PSFCH. Alternatively, the UE may operate in the FD duplex mode during the PSSCH and in the HD duplex mode during the PSFCH.

Depending upon the switching gap size, there is a corresponding rate matching pattern for the PSSCH. The rate matching pattern indicates which resources may be PSSCH and which resources are reserved for the switching gap. In slot 600, the rate matching pattern would thus indicate that the PSSCH extends from the $1^{st}$ symbol to the $7^{th}$ symbol and that the switching gap extends from the $8^{th}$ symbol to the $10^{th}$ symbol. To indicate the rate matching pattern, a UE may use appropriate control information. For example, a UE may use sidelink control information 1 (SCI-1) to signal the rate matching pattern. With regard to the selection of a rate matching pattern, a UE may be configured with a set of rate matching patterns, with one being selected through SCI such as through an index that identifies the rate matching pattern. The rate matching pattern may depend on the subcarrier spacing (SCS) and UE capability. Note that the rate matching pattern may also account for the downlink modulation reference signal (DMRS) pattern. In slot 600, a DMRS occurs in the $5^{th}$ symbol but additional DMRS may also be scheduled as the switching gap is shortened. Other signals such as the phase tracking reference signal (PTRS) or the channel state information reference signal (CSI-RS) may also be scheduled according to the PSSCH rate matching pattern.

Although dynamic switching allows for improved resource utilization and power savings, dynamic switching also adds to complexity. In addition, excessive switching between duplex modes detracts from the improved resource utilization due to the unused symbols during the various switching gaps. A semi-static duplex mode switching schedule may thus be preferable to dynamic switching in certain scenarios such as if the data traffic is periodic and as driven by the UE-to-gNB (Uu) interface. A UE having a separate transit and receive antenna arrays may also benefit from a semi-static scheduling because the RF tuning time and transceiver switching overhead is more manageable. In addition, a semi-static switching pattern may be more suitable when the duplex mode switching depends on the sidelink channel. For example, the PSFCH may have different requirements than the PSSCH. Analogous to the discontinuous reception (DRX) mode in 5G, an FD mode switch is similar to a DRX state. The FD mode may thus have its duration extended through a timer analogous to a DRX inactivity timer. An example network device architecture will now be discussed.

Example Network Device Architecture

Figure 7:
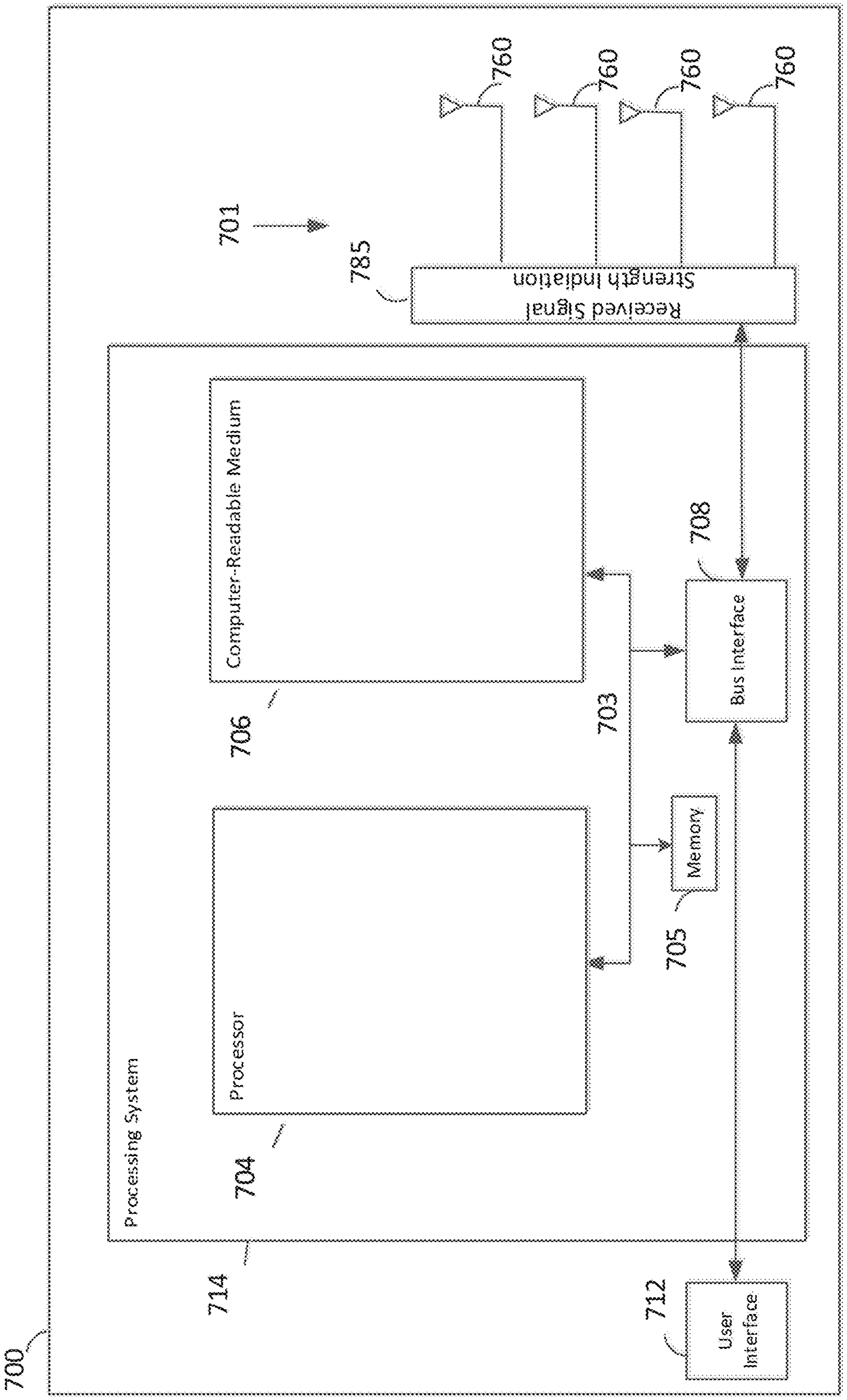
FIG. 7 is a diagram of an example network device configured to practice a sidelink duplex mode indication, switching, and coordination in accordance with an aspect of the disclosure.

An example network device 700 configured to practice duplex mode switching and coordination as discussed herein is shown in FIG. 7. In one implementation, network device 700 may represent a sidelink UE in a mode 2 resource allocation. Alternatively, network device 700 may represent a gNB configured to control the duplex mode switching and coordination in a mode 1 resource allocation. Network device 700 includes a processing system 714 having a bus interface 708, a bus 703, a memory 705, a processor 704, and a computer-readable medium 706. Furthermore, network device 700 may include a user interface 712 and a transceiver 701. Transceiver 701 transmits and receives through an array of one or more antennas 760. In a UE implementation, transceiver 701 may include a received signal strength measuring circuit 785 for measuring the received signal strength so that processor 704 may calculate the CBR to control the duplex mode switching. Alternatively, processor 704 may command transceiver 701 to transmit the CBR to a gNB so that the gNB may command UE 700 to perform a mode switching.

Processor 704 is also responsible for managing the bus 703 and general processing, including the execution of software stored on the computer-readable medium 706. The software, when executed by the processor 704, causes the processing system 714 to execute the duplex mode switching and coordination. The computer-readable medium 706 and the memory 705 may also be used for storing data that is manipulated by the processor 704 when executing software.

The bus 703 may include any number of interconnecting buses and bridges depending on the specific application of the processing system 714 and the overall design constraints. The bus 703 communicatively couples together various circuits including one or more processors (represented generally by the processor 704), the memory 705, and computer-readable media (represented generally by the computer-readable medium 706). The bus 703 may also link various other circuits such as timing sources, peripherals, voltage regulators, and power management circuits, which are well known in the art, and therefore, will not be described any further. The bus interface 708 provides an interface between the bus 703 and the transceiver 701.

Figure 8:
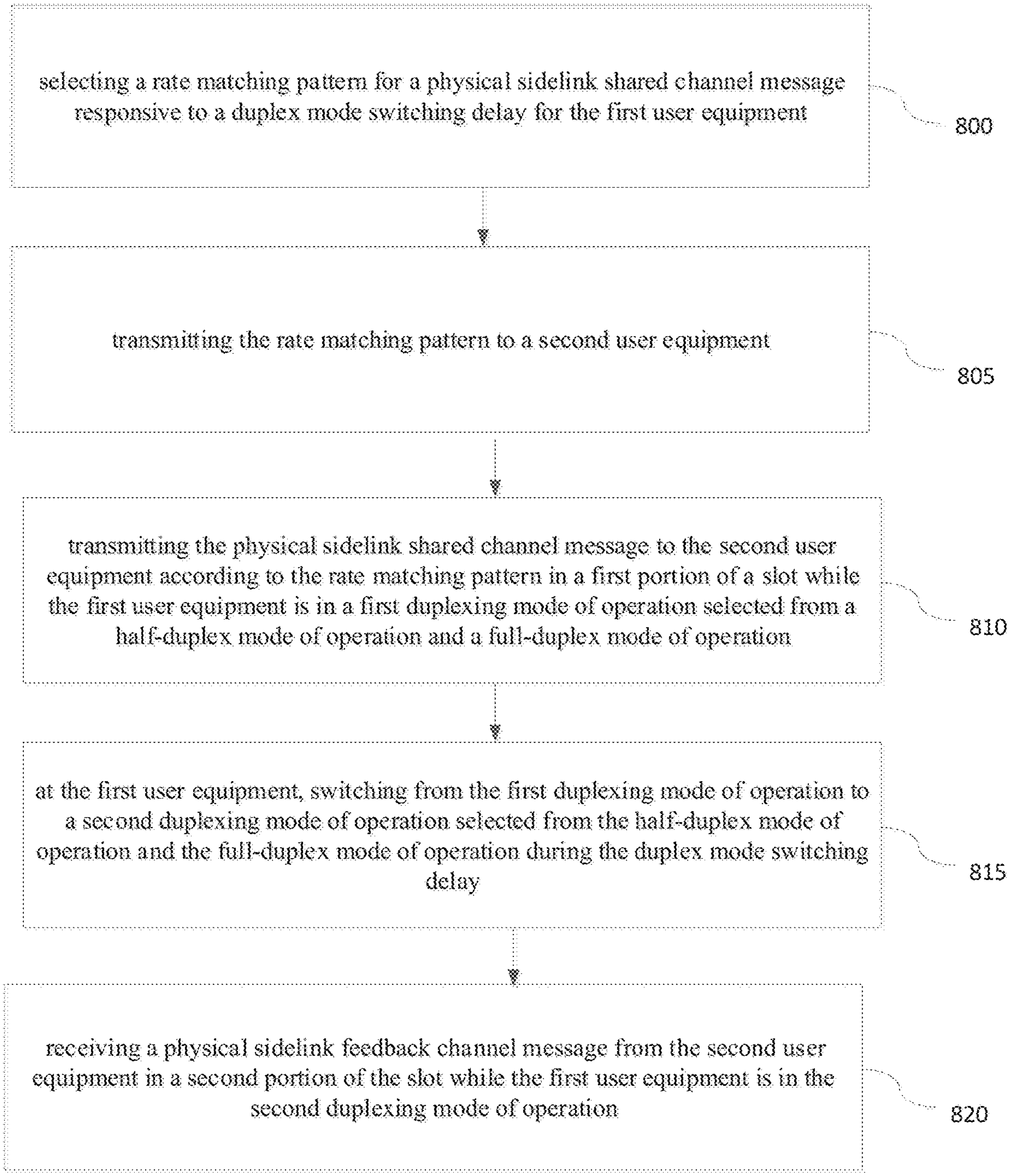
FIG. 8 is a flowchart for an example method of sidelink duplex mode indication, switching, and coordination in accordance with an aspect of the disclosure.

A method of duplex mode switching by a first user equipment will now be discussed regarding the flowchart of FIG. 8. The method includes an act 800 of selecting a rate matching pattern for a physical sidelink shared channel message responsive to a duplex mode switching delay for the first user equipment. An example rate matching pattern for the PSSCH is shown in FIG. 6. The method also includes an act 805 of transmitting the rate matching pattern to a second user equipment. For example, the first user equipment may transmit an index to a set of rate matching patterns to the second user equipment to transmit the rate matching pattern. In addition, the method includes an act 810 of transmitting the physical sidelink shared channel message to the second user equipment according to the rate matching pattern in a first portion of a slot while the first user equipment is in a first duplexing mode selected from a half-duplex mode and a full-duplex mode. The PSSCH of FIG. 6 is an example of such a message. The method also includes an act 815 of, at the first user equipment, switching from the first duplexing mode to a second duplexing mode selected from the half-duplex mode and the full-duplex mode during the during mode switching delay. The mode switching in the gap delay of FIG. 6 is an example of act 815. Finally, the method includes an act 820 of receiving a physical sidelink feedback channel message from the second user equipment in a second portion of the slot while the first user equipment is in the second duplexing mode. The receipt of the PSFCH of FIG. 6 is an example of act 820.

The disclosure will now be summarized in a series of clauses:

Clause 1. A user equipment, comprising:

a transceiver configured to measure a received signal strength;

a processor configured to determine a channel busy ratio from the received signal strength, the processor being further configured to:

select between a full-duplex mode and a half-duplex mode to provide a selected duplex mode based upon at least one of the channel busy ratio and a traffic type for a sidelink, and use the transceiver to communicate over the sidelink according to the selected duplex mode.

Clause 2. The user equipment of clause 1, wherein the processor is further configured to select between the full-duplex mode and the half-duplex mode to provide the selected duplex mode responsive to a delay requirement for a data transmission on the sidelink.

Clause 3. The user equipment of any of clauses 1-2, wherein the processor is further configured to select the full-duplex mode as the selected duplex mode responsive to the channel busy ratio being greater than a channel busy ratio threshold.

Clause 4. The user equipment of clause 3, wherein the processor is further configured to select the half-duplex mode as the selected duplex mode responsive to the channel busy ratio being less than the channel busy ratio threshold.

Clause 5. The user equipment of any of clauses 1-4, wherein the processor is further configured to select the full-duplex mode as the selected duplex mode responsive to the data transmission on the sidelink being an ultra-reliable low-latency communication (URLLC) data transmission.

Clause 6. The user equipment of any of clauses 3-4, wherein the transceiver is further configured to receive the channel busy ratio threshold from a base station.

Clause 7. The user equipment of any of clauses 1-6, wherein the processor is further configured to command the transceiver to use a first semi-persistent scheduling configuration responsive to the selected duplex mode being the full-duplex mode and to use a second semi-persistent scheduling configuration responsive to the selected duplex mode being the half-duplex mode.

Clause 8. The user equipment of clause 7, wherein the first semi-persistent scheduling configuration and the second semi-persistent scheduling configuration each includes a sidelink power control configuration.

Clause 9. The user equipment of clause 7, wherein the first semi-persistent scheduling configuration and the second semi-persistent scheduling configuration each includes a sidelink modulation and coding scheme configuration.

Clause 10. The user equipment of any of clauses 1-9, wherein the processor is further configured to command the transceiver to use a sidelink channel configuration responsive to the selected duplex mode being either the full-duplex mode or the half-duplex mode, and wherein the processor is further configured to dynamically adapt a sidelink power control configuration for the transceiver during the selected duplex mode.

Clause 11. The user equipment of clause 10, wherein the processor is further configured to dynamically adapt a sidelink modulation and coding scheme configuration for the transceiver during the selected duplex mode.

Clause 12. The user equipment of clause 10, wherein the sidelink channel configuration includes a semi-persistent scheduling configuration, and wherein processor is further configured to command the transceiver to transmit a sidelink control information for an identification of transmit parameters for the semi-persistent scheduling configuration.

Clause 13. A base station, comprising:

a transceiver; and a processor configured to control the transceiver to transmit a duplex mode command to a first user equipment to switch from a half-duplex mode to a full-duplex mode responsive to a determination that the first user equipment is scheduled to simultaneously transmit and receive over a sidelink.

Clause 14. The base station of clause 13, wherein the processor is further configured to control the transceiver to transmit the duplex mode indication command in a field in a downlink control information message.

Clause 15. The base station of clause 14, wherein the processor is further configured to control the transceiver to transmit the duplex mode indication command in the field of a downlink control information 3_0 message.

Clause 16. The base station of any of clauses 13-15, wherein the processor is further configured to command the transceiver to transmit the duplex mode indication command to a second user equipment to transition from a half-duplex mode to a full-duplex mode responsive to a determination that the second user equipment is scheduled to simultaneously transmit and receive over the sidelink with the first user equipment.

Clause 17. The base station of any of clauses 13-16, wherein the processor is further configured to command the transceiver to transmit the duplex mode indication command to the first user equipment at a gap delay prior to a time for the first user equipment to simultaneously transmit and receive over the sidelink, wherein the gap delay is a duplex mode switching delay of the first user equipment.

Clause 18. A first user equipment, comprising:

a transceiver; and a processor configured to control the transceiver to transmit a message to a second user equipment on a sidelink between the first user equipment and the second user equipment, the message being a request to the second user equipment to select between a half-duplex mode and a full-duplex mode for communication on the sidelink.

Clause 19. The first user equipment of clause 18, wherein the processor is further configured to command the transceiver to transmit an identification to the second user equipment of whether the first user equipment is in the half-duplex mode or in the full-duplex mode as the message to the second user equipment.

Clause 20. The first user equipment of clause 18, wherein the processor is further configured to command the transceiver to transmit a request to the second user equipment to switch from the half-duplex mode to the full-duplex mode as the message to the second user equipment.

Clause 21. The first user equipment of clause 18, wherein the message is an inter UE coordination message.

Clause 22. The first user equipment of clause 19, wherein the identification to the second user equipment of whether the first user equipment is in the half-duplex mode or in the full-duplex mode includes an indication that the first user equipment is to perform a fallback from the full-duplex mode to the half-duplex mode.

Clause 23. A method of duplex mode switching by a first user equipment, comprising:

selecting a rate matching pattern for a physical sidelink shared channel message responsive to a duplex mode switching delay for the first user equipment;

transmitting the rate matching pattern to a second user equipment;

transmitting the physical sidelink shared channel message to the second user equipment according to the rate matching pattern in a first portion of a slot while the first user equipment is in a first duplexing mode selected from a half-duplex mode and a full-duplex mode;

at the first user equipment, switching from the first duplexing mode to a second duplexing mode selected from the half-duplex mode and the full-duplex mode during the duplex mode switching delay, and receiving a physical sidelink feedback channel message from the second user equipment in a second portion of the slot while the first user equipment is in the second duplexing mode.

Clause 24. The method of clause 23, wherein the first duplexing mode is the half-duplex mode and the second duplexing mode is the full-duplex mode.

Clause 25. The method of clause 23, wherein the first duplexing mode is the full-duplex mode and the second duplexing mode is the half-duplex mode.

Clause 26. The method of any of clauses 23-25, wherein transmitting the rate matching pattern comprises transmitting a sidelink control information message.

Clause 27. The method of any of clauses 23-26, wherein selecting the rate matching pattern for the physical sidelink shared channel message is further responsive to a subcarrier spacing for the first user equipment.

Clause 28. The method of any of clauses 23-27, further comprising:

identifying non-preferred resources to the second user equipment, wherein the non-preferred resources include a third portion of the slot corresponding to the duplex mode switching delay.

Clause 29. The method of any of clauses 23-27, further comprising identifying preferred resources to the second user equipment, wherein the preferred resources exclude a third portion of the slot corresponding to the duplex mode switching delay.

Clause 30. The method of any of clauses 23-29, wherein the switching from the first duplexing mode to the second duplexing mode occurs according to a semi-static scheduling.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A user equipment, comprising:

a transceiver configured to measure a received signal strength and to receive a channel busy ratio threshold from a base station; and a processor configured to determine a channel busy ratio from the received signal strength, the processor being further configured to:

compare the channel busy ratio to the channel busy ratio threshold;

select between a full-duplex mode and a half-duplex mode to provide a selected duplex mode for a sidelink responsive to a delay requirement for transmission on a physical sidelink shared channel (PSSCH), wherein the processor is configured to select the full-duplex mode as the selected duplex mode when the channel busy ratio is greater than the channel busy ratio threshold, and to select the half-duplex mode as the selected duplex mode when the channel busy ratio is less than the channel busy ratio threshold;

select a rate matching pattern for the PSSCH responsive to a duplex mode switching delay;

switch a Radio Resource Control scheduling configuration responsive to the selected duplex mode; and use the transceiver to transmit on the PSSCH according to the selected duplex mode and the rate matching pattern, and to communicate over the sidelink according to the Radio Resource Control scheduling configuration.

2. The user equipment of claim 1, wherein the processor is further configured to select the full-duplex mode as the selected duplex mode when a transmission on the PSSCH is an ultra-reliable low-latency communication (URLLC) transmission.

3. The user equipment of claim 1, wherein the processor is further configured to communicate over the sidelink according to a first semi-persistent scheduling configuration responsive to the selected duplex mode being the full-duplex mode and according to a second semi-persistent scheduling configuration responsive to the selected duplex mode being the half-duplex mode.

4. The user equipment of claim 3, wherein the first semi-persistent scheduling configuration and the second semi-persistent scheduling configuration each includes a sidelink power control configuration.

5. The user equipment of claim 3, wherein the first semi-persistent scheduling configuration and the second semi-persistent scheduling configuration each includes a sidelink modulation and coding scheme configuration.

6. The user equipment of claim 1, wherein the processor is further configured to:

communicate over the sidelink according to a sidelink channel configuration responsive to the selected duplex mode being either the full-duplex mode or the half-duplex mode; and dynamically adapt a sidelink power control configuration during the selected duplex mode.

7. The user equipment of claim 6, wherein the processor is further configured to dynamically adapt a sidelink modulation and coding scheme configuration during the selected duplex mode.

8. The user equipment of claim 6, wherein the sidelink channel configuration includes a semi-persistent scheduling configuration, and wherein the transceiver is configured to transmit a sidelink control information message for an identification of transmit parameters for the semi-persistent scheduling configuration.

9. The user equipment of claim 1, wherein the processor is further configured to signal to another device a gap delay for switching the selected duplex mode.

10. The user equipment of claim 1, wherein the processor is further configured to include, within non-preferred resources signaled to another device, a set of symbols to perform a switch of the selected duplex mode.

11. The user equipment of claim 1, wherein the processor is further configured to receive, from another device, an indication of whether the other device is to perform a fallback from the full-duplex mode to the half-duplex mode.

12. The user equipment of claim 1, wherein the processor is further configured to transmit, via the transceiver, a request message to another device to select between the half-duplex mode and the full-duplex mode for communication on the sidelink.

13. The user equipment of claim 1, wherein the processor is further configured to operate in a first duplex mode during a first portion of a slot, perform a switch to a second duplex mode during a gap delay, and operate in the second duplex mode during a second portion of the slot.

14. A method of wireless communication performed at a user equipment (UE), comprising:

measuring a received signal strength;

receiving, from a base station, a channel busy ratio threshold generated by the base station;

calculating a channel busy ratio from the measured received signal strength;

comparing the channel busy ratio to the channel busy ratio threshold;

selecting a duplex mode for sidelink communication responsive to a delay requirement for transmission on a physical sidelink shared channel (PSSCH), wherein a full-duplex mode is selected when the channel busy ratio is greater than the channel busy ratio threshold, and a half-duplex mode is selected when the channel busy ratio is less than the channel busy ratio threshold;

selecting a rate matching pattern for the PSSCH responsive to a duplex mode switching delay:

switching a Radio Resource Control scheduling configuration responsive to the selected duplex mode; and communicating over a sidelink by transmitting on the PSSCH according to the selected duplex mode, the rate matching pattern, and the Radio Resource Control scheduling configuration.

15. The method of claim 14, further comprising selecting the full-duplex mode for sidelink communication when a transmission on the PSSCH is an ultra-reliable low-latency communication (URLLC) transmission.

16. The method of claim 14, wherein switching the Radio Resource Control scheduling configuration comprises switching between a first semi-persistent scheduling configuration when the selected duplex mode is the full-duplex mode and a second semi-persistent scheduling configuration when the selected duplex mode is the half-duplex mode.

17. The method of claim 16, wherein each of the first and second semi-persistent scheduling configurations includes a sidelink power control configuration.

18. The method of claim 16, wherein each of the first and second semi-persistent scheduling configurations includes a sidelink modulation and coding scheme configuration.

19. The method of claim 14, further comprising communicating over the sidelink according to a sidelink channel configuration that is responsive to whether the selected duplex mode is the full-duplex mode or the half-duplex mode, and dynamically adapting a sidelink power control configuration while operating in the selected duplex mode.

20. The method of claim 19, further comprising dynamically adapting a sidelink modulation and coding scheme configuration while operating in the selected duplex mode.

21. The method of claim 19, further comprising transmitting, via a transceiver, a sidelink control information message identifying transmit parameters for a semi-persistent scheduling configuration included in the sidelink channel configuration.

22. The method of claim 14, further comprising signaling, to another device, a gap delay for switching the selected duplex mode.

23. The method of claim 14, further comprising including, within non-preferred resources signaled to another device, symbols to perform a switch of the selected duplex mode.

24. The method of claim 14, further comprising receiving, from another device, an indication that the other device is to perform a fallback from the full-duplex mode to the half-duplex mode.

25. The method of claim 14, further comprising transmitting, to another device, a request to select between the half-duplex mode and the full-duplex mode for communication on the sidelink.

26. The method of claim 14, further comprising operating in a first duplex mode during a first portion of a slot, switching to a second duplex mode during a gap delay, and operating in the second duplex mode during a second portion of the slot.

27. A non-transitory computer-readable medium storing one or more instructions for wireless communication, the one or more instructions comprising:

one or more instructions that, when executed by one or more processors of a user equipment (UE), cause the one or more processors to:

measure a received signal strength;

receive, from a base station, a channel busy ratio threshold generated by the base station;

calculate a channel busy ratio from the measured received signal strength;

compare the channel busy ratio to the channel busy ratio threshold;

select a duplex mode for sidelink communication responsive to a delay requirement for transmission on a physical sidelink shared channel (PSSCH), wherein a full-duplex mode is selected when the channel busy ratio is greater than the channel busy ratio threshold, and a half-duplex mode is selected when the channel busy ratio is less than the channel busy ratio threshold;

select a rate matching pattern for the PSSCH responsive to a duplex mode switching delay;

switch a Radio Resource Control scheduling configuration responsive to the selected duplex mode; and communicate over a sidelink by transmitting on the PSSCH according to the selected duplex mode, the rate matching pattern, and the Radio Resource Control scheduling configuration.

28. The non-transitory computer-readable medium of claim 27, wherein the one or more instructions, when executed by the one or more processors, further cause the one or more processors to select the full-duplex mode when a transmission on the PSSCH is an ultra-reliable low-latency communication (URLLC) transmission.

29. The non-transitory computer-readable medium of claim 27, wherein the one or more instructions, when executed by the one or more processors, further cause the one or more processors to operate in a first duplex mode during a first portion of a slot, switch duplex modes during the duplex mode switching delay, and operate in a second duplex mode during a second portion of the slot.

* * * * *